Sept. 28, 1965  A. H. NETHERCOT, JR  3,208,342
ELECTRO-OPTIC LIGHT COUPLING OF OPTICAL FIBERS
Filed Sept. 18, 1962  2 Sheets-Sheet 1

INVENTOR
ARTHUR H. NETHERCOT, JR.

BY *Irons, Birch, Swindler & McKie*
ATTORNEYS

United States Patent Office 3,208,342
Patented Sept. 28, 1965

3,208,342
ELECTRO-OPTIC LIGHT COUPLING OF OPTICAL FIBERS
Arthur H. Nethercot, Jr., Hastings-on-Hudson, N.Y., assignor to International Business Machines Corporation, New York, N.Y., a corporation of New York
Filed Sept. 18, 1962, Ser. No. 224,385
17 Claims. (Cl. 88—61)

This invention relates to light coupling apparatus and, more particularly, to apparatus for controllably coupling light from one conductor to another.

Though interest has long been expressed in light control apparatus, such as light valves, such interest has lately become more extensive by reason partially of the advent of light sources such as lasers. For use particularly (though not exclusively) with such sources of light it is desirable to be able to control or switch the coupling of light from one light conductor to one or more other conductors. Such apparatus will be useful in such applications as beam deflectors for writing purposes, in shift registers for computing apparatus and in modulators and beam scanners.

It has been previously suggested that light energy be controlled or modulated by passing the light through a material of controllable refractive index, this material being immersed in another material of constant refractive index having approximately the same magnitude as the refractive index of the controllable material. In contrast to this prior suggestion, it is a principal object of the present invention, not merely to control the transmission of light through one conductor, but rather to control the coupling of light between two different conductors.

The prior art also contains suggestions for light modulation through use of piezoelectric materials which may be exposed to mechanical strains by variation in the electrical voltage applied to such materials. In one suggestion two crystals of piezoelectric material were mounted adjacent each other so that they might be moved into or out of contact and thereby transmit, or fail to transmit, light from one crystal through the other. In another suggestion, a piezoelectric material formed one of two transparent media which were spaced apart by a distance controlled by the electrical modulation potential supplied to the piezoelectric material. Variation in the spacing between the two materials caused by the modulating voltage then varied the amount of light energy transmitted through the modulator.

In contrast with these prior suggestions, though piezoelectric materials are contemplated as active materials in the present invention, the variation in mechanical strain caused by application of varying electrical voltage to such materials is not employed, but rather the variation in refractive index of such materials with varying voltage is used to control the coupling between two light conductors.

The apparatus of the invention, broadly speaking, includes at least a pair of light conductors having a coupling medium positioned therebetween. One of the light conductors and the coupling medium is of ferroelectric or piezoelectric material, so that a controllable electrical field may be employed to vary the refractive index of that one material. With the two light conductors spaced very closely together along at least respective fractional portions of their length, the fringing field that surrounds all light conductors may then be employed to couple light from one conductor to another to a degree determined by the magnitude of the field. Such variation may be obtained by applying a controllable voltage across electrodes positioned opposite each other adjacent the ferroelectric or piezoelectric material.

The foregoing and other objects, features and advantages of the invention will be apparent from the following more particular description of preferred embodiments of the invention, as illustrated in the accompanying drawings.

Figure 1:
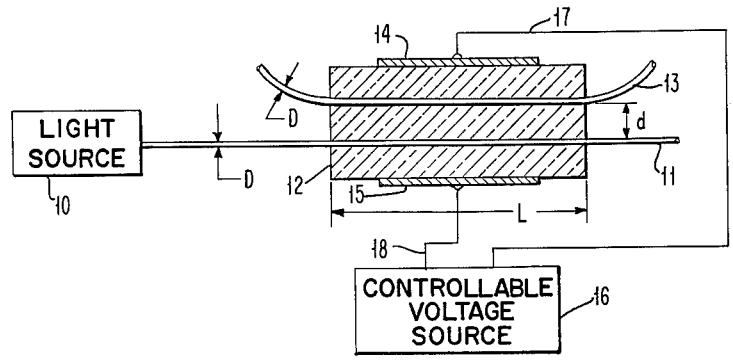
FIG. 1 is a schematic illustration of one embodiment of the invention employing a ferroelectric or piezoelectric material as the coupling medium between two light conductors.

Referring first to FIG. 1, a light source 10 supplies light to a light conductor 11 which may appropriately be an optical fiber. The light source may appropriately include a laser, which supplies coherent, monochromatic light, though any appropriate light source may be used with the apparatus of the invention. While an optical fiber is not essential to operation of the invention, and any light conductor may be employed in the place of the fiber 11, such fibers are particularly useful in the invention and are therefore preferred. As is well known, optical fibers function in conducting light by the phenomenon of "total internal reflection." However, even when the entrance angle to the light conductor is greater than the critical angle of the conductor, so that total internal reflection can occur, there exists about the conductor a fringing field. The extent of such fields in the direction away from the conductor varies extremely rapidly inversely with the diameter of the conductor and depends upon the characteristics of the surrounding medium.

In the apparatus of FIG. 1 the optical fiber 11 is embedded in a ferroelectric or piezoelectric coupling material 12. Also embedded in the coupling material 12 is a second optical fiber 13 which may be appropriately, though not necessarily, of the same diameter as the fiber 11. The fiber 13 is spaced from the fiber 11 by a very small distance sufficient that it is exposed to the fringing field due to the light wave conducted by fiber 11. Though the amount of the coupling depends upon the length "L" of the area of sufficiently close spacing between the light conductors, and therefore a large spacing may be compensated for by extending the length of closets spacing, it will be preferred in the ordinary case that the distance between the portions of conductors 11 and 13 which are closest to each other be no greater than about the wave length of the light to be coupled between them, divided by the difference of the indices of refraction of one of the light conductors 11 and 13 and the coupling material 12.

The amount of light coupled from the conductor 11 to the conductor 13 will depend upon the diameter of the fibers "D" as well as the spacing between the fibers "d." Further, the amount of coupled light energy will depend in periodic fashion on the length "L," being proportional to $\sin^2 \pi L/L_0$ where $L_0$ is a constant depending on the separation distance $d$, the fiber diameter D, the indices of refraction of the fibers and the coupling material, and the frequency of the light. It will be evident therefore that if the index of refraction of the coupling material 12 is changed, the amount of light coupled between the conductor 11 and conductor 13 will correspondingly change.

Such change in index of refraction is obtained with the apparatus of FIG. 1 by changing the electric field applied to the coupling medium. Such change in field may be accomplished by applying a changing voltage between a pair of electrodes or plates 14 and 15 which are spaced apart adjacent the coupling medium 12. If the coupling medium has a transverse electro-optic effect, the plates may be mounted at opposite sides of the coupling medium 12 and connected to a suitable controllable voltage source 16 by respective conductors 17 and 18.

Since a charge in applied field is provided for by the apparatus of FIG. 1, either a ferroelectric or a piezoelectric material may be employed as the active material. Of course ferroelectric materials are also piezoelectric, at least below their transition, or Curie temperatures, but not all piezoelectric materials are ferroelectric, so that it is indicated specifically that both types of material may be used as the coupling medium 12. However, the change in index of refraction of a non-ferroelectric piezoelectric material with applied field is very much less than for a ferroelectric material, so that the field must be very much larger for use of the former materials. Therefore, the ferroelectric materials are definitely preferred in this invention. Examples of suitable ferroelectric materials include barium titanate, strontium titanate, tri-glycene sulfate (TGS), potassium dihydrogen phosphate (KDP) and rochelle salt. Suitable piezoelectric materials are cuprous chloride and quartz. These specific materials, however, are merely representative of wider classes of materials.

Since the index of refraction of a ferroelectric material varies with applied field both in its ferroelectric state (below the Curie point) and in its paraelectric state (above the Curie point), the ferroelectric component may be operated either above or below that point. However, operation below the Curie point involves hysteresis effects, resulting in power losses and heating effects, so that in general it will be preferred that the ferroelectric material be operated above the Curie point. Moreover, since the magnitude of change in index of refraction with applied field is maximum near the Curie point, it is preferred that, where possible, the ferroelectric material be operated within a few degrees of its Curie point. Nevertheless, it will be understood that a usable change in index of refraction with applied field can be obtained over at least a wide range of temperatures, so that temperature control, though desirable, is not essential to the invention.

It will be apparent from the above that where ferroelectric materials are referred to herein, it is not meant that such materials must be operated at temperatures such as to exhibit the ferroelectric effect, since it is actually preferred that they be operated at temperatures where they act as paraelectrics.

It is known that all piezoelectric materials and many ferroelectric materials, have indices of refraction which vary linearly with variation in applied fields. If such materials are employed as the coupling medium 12 in the apparatus of FIG. 1, the coupling medium must be a single crystal, since a polycrystalline material would have its crystals arranged haphazardly and the changes in index of refraction of the various crystals would tend to balance out each other with the result that variation in applied field would not provide the desired variation in resultant index of refraction. In contrast, certain ferroelectric materials, such as barium and strontium titanate and tri-glycene sulfate have the characteristic of nonlinear change in index of refraction with change in applied field. As a result, it is not essential that single crystal materials be employed as the coupling medium 12 in the apparatus of FIG. 1 if such non-linear characteristic materials are employed. This will be very advantageous in the practice of the invention, especially when a complicated structure is desired, since it is generally difficult and expensive to obtain large single crystals of ferroelectric or piezoelectric materials.

It is essential that the light conductors 11 and 13 be of higher index of refraction than the surrounding medium, in order that light conduction by total integral reflection may occur. Since ferroelectric materials have relatively high indices of refraction, not all light conductors may be employed in the elements 11 and 13, but rather only light conductors having high indices of refraction may be used. As illustrations of this criterion, the indices of refraction of barium and strontium titanate are about 2.4 and those of TGS and KDP are approximately 1.5, while crown glass has an index of refraction of 1.5. However, the heaviest flint glass has an index of refraction of about 1.96, so that such glass or a lighter flint glass may be employed as the optical conductors 11 and 13 with some ferroelectric materials, such as TGS and KDP. Also, arsenic tri-sulfide glass has an index of refraction of 2.66 so that the optical fibers may be made of such material, for most ferroelectric materials which might be employed.

If the voltage and other characteristics affecting the amount of coupled light are chosen such that the length L is equal to $n'L_0/2$, wherein $n'$ is an odd integer, all of the light from conductor 11 will be coupled to conductor 13. If the applied voltage is changed to some different amount, then a lesser amount of light may be coupled, and the characteristics of the apparatus may be adjusted such that no light is coupled under certain circumstances. Further, a steady bias field might be applied by the controllable voltage source 16 to increase the magnitude of the effect caused by change in applied voltage.

It has been indicated that the amount of light coupled to the conductor 13 may be increased by increase in the applied voltage between the electrodes 14 and 15. Conversely, of course, the amount of light remaining in the conductor 11 after passage through the coupling area will decrease as the applied voltage increases.

The apparatus of FIG. 1 therefore may be employed for light modulation purposes since, as indicated above, the amount of light coupled from conductor 11 to conductor 13 will depend upon the magnitude of the voltage applied between electrodes 14 and 15.

In the apparatus of FIG. 1 the coupling medium 12 is shown as surrounding the conductors 11 and 13. This is desirably obtained by casting or potting the active material around the passive light conductors. However, it is not essential that the active coupling medium surround the light conductors since there could merely be a block of such material positioned between the two conductors.

Figure 2:
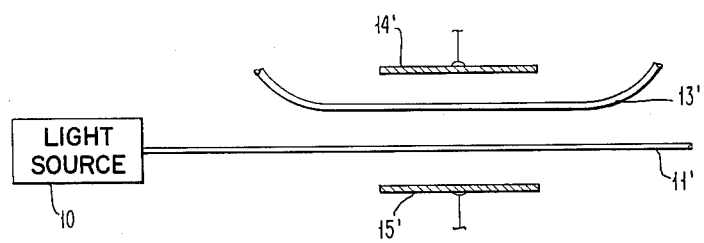
FIG. 2 is a schematic representation of a modification of the apparatus of FIG. 1 in which one of the light conductors is of ferroelectric material and the coupling medium is air.

Referring now to FIG. 2, it is not essential to the invention that the coupling material be the active material. Rather, one of the light conductors (or both), such as the optical fiber 11', might be made of ferroelectric material. This would be quite advantageous since nearly any coupling medium might then be employed, including a transparent plastic, or even air. However, it is essential to the invention that each of the light conductors be of good optical properties. Since scattering must be avoided, it is therefore necessary that the optical fiber 11' of the apparatus of FIG. 3 be a single crystal. The difficulty of forming a single crystal optical fiber of sufficient length and of appropriate other characteristics from ferroelectric material may well make it more desirable that the coupling material be active and the light conductors both be passive (that is, have an index of refraction which does not vary with applied field).

Figure 3:
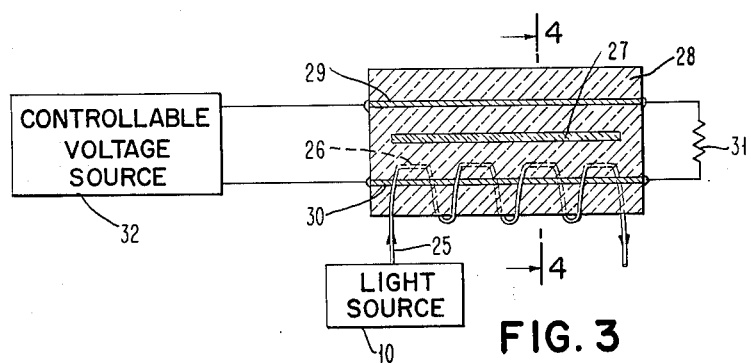
FIG. 3 shows in schematic form another embodiment of the invention functioning particularly as a light deflector or an optical scanner.
Figure 4:
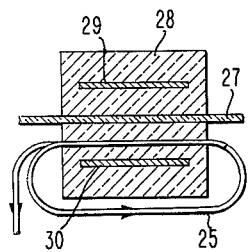
FIG. 4 is a sectional view taken along line 4—4 of FIG. 3.

Another embodiment of the invention is shown in FIGS. 3 and 4 in which the two light conductors include a helical conductor 25 preferably having a flattened surface in a portion of each loop, as is indicated at 26, and a light conducting plate 27. Both the plate 27 and the conductor 25 may be either glass or a suitable transparent plastic, as may be the light conductors of any of the embodiments of the invention. The active coupling material 28 is desirably of ferroelectric properties and surrounds both the light conductors and a strip transmission line formed by conductors 29 and 30. This line may be suitably terminated by a resistance 31 at one end and be connected to a controllable voltage source 32 at the opposite end. The voltage source may appropriately supply pulses of voltage which will then travel down the length of the transmission line at a relatively high speed. The duration of each voltage pulse from source 32 is desirably in the microsecond or submicrosecond range.

The apparatus of FIGS. 3 and 4 is particularly suitable for a light deflector of an optical scanner. In operation of that apparatus, light may be conducted through a helical fiber 25 from a suitable light source 10, such as a laser, and the voltage pulse moving down the transmission line will change the index of refraction of the ferroelectric coupling medium 28, as it travels, thereby giving rise to successive pulses of light in the conductor 27. These light pulses will of course be produced in conductor 27, as shown in FIG. 3, at successive positions from left to right. If the speed of the voltage pulse from left to right in that figure is twice as fast as the speed of light in the same direction, and if the pulse length is chosen properly, all of the light will be coupled from conductor 25 to conductor 27, and none will exit from the coupling area through the conductor 25. Of course slower pulse speeds may be employed but in such case not all of the light will be coupled from one conductor to the other and some will exit from the coupling area through the conductor 25.

Figure 5:
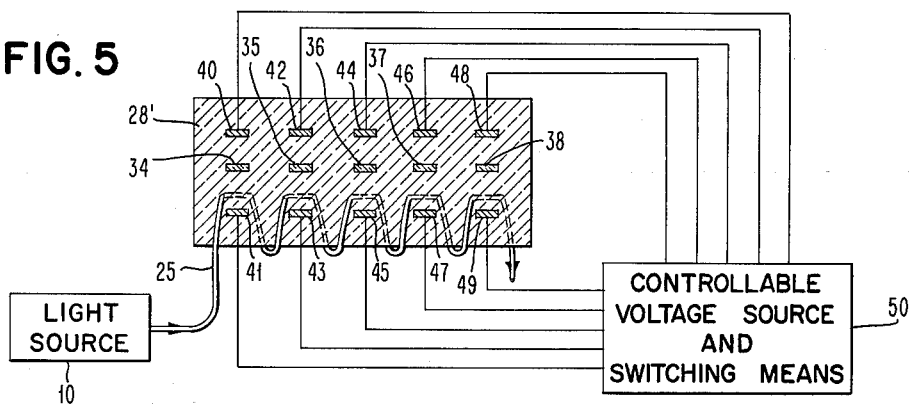
FIG. 5 is a schematic view of a modification of the embodiment of FIGS. 3 and 4, showing a plurality of electrodes, rather than a transmission line, for creating the electric fields for operation of the invention; and also showing the use of a plurality of light conductors in place of one of the conductors of that embodiment.

FIG. 5 shows a modification of the apparatus of FIGS. 3 and 4 in which a series of optical fibers 34–38 are employed in place of the plate 27. In such case, each of the fiber conductors 34–38 lies immediately above and parallel to the flattened portion of the respective loop of the fiber conductor 25. The use of fiber conductors, rather than the plate 27 may be advantageous by reason of the avoidance of spreading out of the light as it passes through the conductor to which the light is coupled. A sectional view of FIG. 5 would appear the same as FIG. 4 with the single exception that the plate 27 would now become any one of the fibers 34–38. The flattened turns of the helical fiber 25 lie parallel to the fibers 34–38.

The transmission line 29 and 30 may be used with the fiber conductors 34–38, but it is also possible to employ a series of pairs of electrodes 40–49, in place of the transmission line. These pairs of electrodes may then be activated individually in various time sequences by a controllable voltage source and switching means 50. The apparatus 50 may be of any suitable type but may appropriately include a cyclic switch which applies a pulse of voltage sequentially across the several electrode pairs, at high speed.

Figure 6:
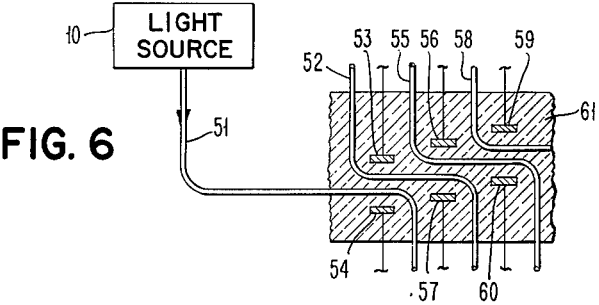
FIG. 6 is a schematic view of a further embodiment of the invention designed particularly to function as a shift register in an optical logic system.

FIG. 6 shows an illustration of the invention as applied to a shift register which might be used in an optical logic system. In FIG. 6 the light source 10 supplies light to a conductor 51 which, over a portion of its length, is spaced closely adjacent to a first portion of the length of a second conductor 52. A pair of electrodes 53 and 54 are positioned at opposite sides of these portions of conductors 51 and 52 and may be connected to a controllable voltage source and switching means such as the one generally shown at 50 in FIG. 5. A second portion of the conductor 52 is closely spaced from a first portion of a third light conductor 55 and these portions are mounted between electrodes 56 and 57. Similarly, the light conductor 55 has a second portion which is closely spaced from a first portion of a fourth light conductor 58, and a pair of electrodes 59 and 60 are mounted at opposite sides of these portions of the conductors 55 and 58. The arrangement may be repeated to provide as many sets of conductors and electrodes as desirable, and all sets of conductors are separated by a ferroelectric material forming the coupling medium 61. All of the electrodes may also be connected to the controllable voltage source and switching means, and light may then be coupled successively from conductor 51 to conductor 58 by appropriate sequential application of voltage pulses to the respective electrode pairs. The application of this apparatus to a shift register will be apparent, since successive input pulses supplied to successive electrode pairs will successively sift the light to successive conductors.

Figure 7:
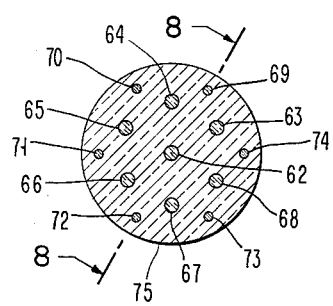
FIG. 7 is a view of an arrangement of the light conductors and electrodes such as might be used in a cable to form a further embodiment of the invention.
Figure 8:
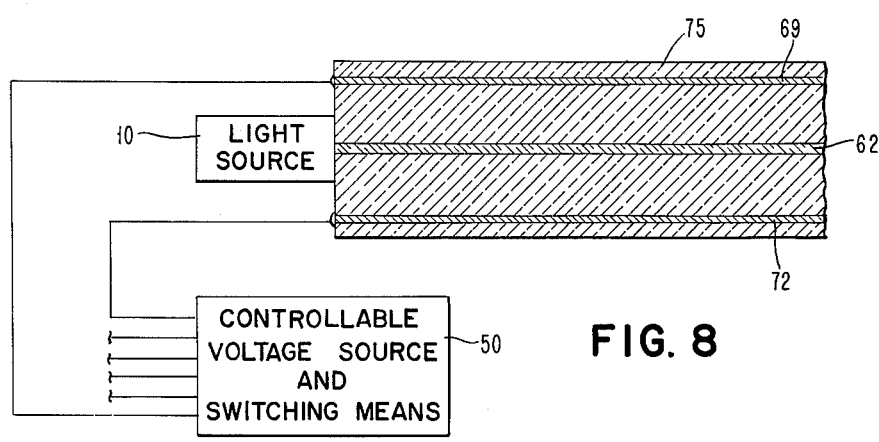
FIG. 8 is a cross sectional view taken along line 8—8 of FIG. 7, showing schematically the connection of the light source and the voltage source to the cable of FIG. 7.

A final embodiment of the apparatus is shown in FIGS. 7 and 8, utilizing a center light conductor or optical fiber 62 and a plurality of surrounding light conductors 63–68. These light conductors are desirably equally spaced from the center conductors. Mounted between light conductors 63–68 are a corresponding plurality of electrical conductors 69–74. These electrical conductors are appropriately equally spaced from their adjacent optical conductor. All of the light conductors and electrical conductors are mounted in a coupling medium 75 desirably formed of ferroelectric material.

With the apparatus of FIGS. 7 and 8, if a voltage of suitable magnitude is applied between electrical conductors or electrodes 69 and 74, light will be coupled between the light conductor 62 and the light conductor 63. If the voltage is then shifted to be between electrodes 73 and 74, the light from conductor 62 will be coupled to conductor 68, etc. The light coupled from the center fiber to the outer fiber will then depend upon which ones of the sets of electrodes are actuated. The amount of light coupled to any other fiber than the one located between the selected electrodes will be only a small fraction of the amount of light coupled to that selected fiber.

It will be apparent that other numbers of fibers and electrodes could be used, and the fibers could be fanned out into any shape or pattern after leaving the ferroelectric coupling medium. In such fashion, displays or scanners could be constructed from the apparatus of FIGS. 7 and 8.

It will be apparent that the considerations expressed particularly in conjunction with the embodiments of FIGS. 1 and 2, apply also to the embodiments of the remaining figures. Specifically, the light conductors must each be of index of refraction higher than that of the coupling material, the coupling medium must be at least translucent and is preferably transparent, and the active material will be chosen in accordance with the characteristics described and the application for which the apparatus is specifically designed. Further, while the invention has been particularly shown and described with reference to preferred embodiments thereof, it will be understood by those skilled in the art that the foregoing and other changes in form and detail may be made therein without departure from the spirit and scope of the invention.

What is claimed is:

1. Apparatus for controllably coupling light from one conductor to another, comprising:
   (a) a first and a second light conductor positioned in close proximity to, but spaced from one another over respective portions of their lengths;
   (b) means for introducing light into the first conductor;
   (c) a translucent coupling medium positioned between said conductors in intimate contact therewith, said coupling medium having a lower index of refraction than that of either of said conductors;
   (d) and means for controllably varying the index of refraction of said coupling medium relative to that of the light conductors, whereby the quantity of light transferred from said first conductor to said second conductor will vary in accordance with the changes in the relativity of the respective indices of refraction.

2. The apparatus of claim 1 wherein said coupling medium is fabricated of an electro-optic material having an index of refraction which varies in response to the magnitude of an electric field applied thereto.

3. The apparatus of claim 2 wherein said electro-optic material is a ferroelectric material.

4. The apparatus of claim 2 wherein said electro-optic material is a piezo-electric material.

5. The apparatus of claim 1 wherein said light conductors are optical fibers and one of which is fabricated of an electro-optic material having an index of refraction which varies in response to the magnitude of an electric field applied thereto.

6. The apparatus of claim 5 wherein said electro-optic material is a ferroelectric material.

7. The apparatus of claim 5 wherein said electro-optic material is a piezo-electric material.

8. Apparatus for controllably coupling light from one conductor to another, comprising:
   (a) a first and a second optical fiber positioned parallel to and in close proximity to one another over substantial portions of their lengths;
   (b) means for introducing light into said first fiber;
   (c) a translucent coupling medium, encapsulating both said fibers for the said portions of their length said medium being fabricated of an electro-optic material whose index of refraction is lower than that of said fibers and which varies in response to the magnitude of an electric field applied thereto;
   (d) a pair of electrodes positioned adjacent to said coupling medium and operative when potentialized to apply an electric field to the medium;
   (e) and means for applying a variable electrical potential to said electrodes, whereby the quantity of light coupled from said first fiber to said second fiber will vary under control of the applied potential.

9. The apparatus of claim 8 wherein said coupling medium is fabricated of a ferroelectric material whose index of refraction varies non-linearly with the magnitude of the applied field.

10. The apparatus of claim 9 wherein the ferroelectric coupling medium is one chosen from the group consisting of barium titanate, tri-glycene sulfate and strontium titanate.

11. The apparatus of claim 9 wherein the spacing between the said optical fibers is less than the wavelength of the frequency of the light to be coupled, divided by the difference of the indices of refraction of said first fiber and said coupling medium.

12. Apparatus for controllably coupling light comprising:
   (a) a helical optical fiber having a portion of each turn thereof flattened so that the flattened portions lie substantially in a common plane;
   (b) means for introducing light into said fiber;
   (c) at least one light conductor extending parallel to at least one of said flattened portions and positioned in close proximity thereto;
   (d) a coupling medium of ferroelectric material positioned between the fiber and said conductor in intimate contact therewith, said ferroelectric material having an index of refraction lower than that of said fiber and said conductor;
   (e) and means for supplying an electric field through said coupling medium in a direction perpendicular to the plane of the said flattened portions and travelling parallel to said plane.

13. The apparatus of claim 12 in which said light conductor is a plate of optical material disposed parallel to the plane in which said flattened portions lie.

14. The apparatus of claim 13 in which said means for supplying the travelling electric field includes a strip transmission line and means for applying voltage pulses thereto.

15. The apparatus of claim 12 including a plurality of light conductors each of which is positioned parallel to and in close proximity to a respective different one of said flattened portions of said fiber.

16. The apparatus of claim 15 in which said means for supplying the travelling electric field includes a strip transmission line and means for applying voltage pulses thereto.

17. The apparatus of claim 15 in which said means for supplying the travelling electric field includes a plurality of pairs of electrodes each pair being disposed to include in its field one of said flattened portions and its respective light conductor, and means for selectively potentializing said electrodes in pairs, said coupling medium having an electro-optic effect extending perpendicular to said common plane.

References Cited by the Examiner

UNITED STATES PATENTS 3,051,003   8/62   Witt _____ 88—1 X
3,099,805   7/63   Berk et al. _____ 333—24.1

OTHER REFERENCES

N. S. Kapany et al.: Infrared Fiber Optics, Armour Research Foundation Yearly Report, AD 235 192; pages 38–42 of appendix.

JEWELL H. PEDERSEN, *Primary Examiner.*